April 19, 1955     V. R. KIMBALL     2,706,611

SHOCK-PROOF MOUNTING

Filed Feb. 10, 1949

INVENTOR.
VERNON R. KIMBALL
BY
ATTORNEY

United States Patent Office 2,706,611
Patented Apr. 19, 1955

2,706,611

SHOCK-PROOF MOUNTING

Vernon R. Kimball, Maywood, N. J., assignor to Bendix Aviation Corporation, Teterboro, N. J., a corporation of Delaware Application February 10, 1949, Serial No. 75,611

5 Claims. (Cl. 248—204)

The present invention relates to shock mountings, and more particularly to shock mountings for vacuum tubes.

An object of my present invention is to provide a shock mounting for a vacuum tube in which the natural frequency of the mounted tube and its elements are outside of any range of frequencies to which the supporting base or panel may be subjected so that mechanical noise or microphonics are not present in the output of the mounted tube.

Another object of my invention is to provide a shock mounting for a vacuum tube which provides a sufficiently large area of heat conducting material in intimate relation with the tube envelope to aid in the dissipation of heat from said mounted tube.

A further object of the present invention is to provide a shock mounting for a vacuum tube which will hold the tube firmly in place, the turning and twisting or attempts to slide the tube out of the mounting merely serving to tighten the hold on the mounted tube.

Still another object of this invention is to provide a shock mounting of the general character indicated which shall consist of few and simple parts, inexpensive to manufacture, which shall be positive in its action, yet easily and simply attached and removed, which shall have a large variety of application and yet be practical and efficient to a high degree in use.

Other objects of the invention will in part be obvious and in part hereinafter pointed out.

Figure 1:
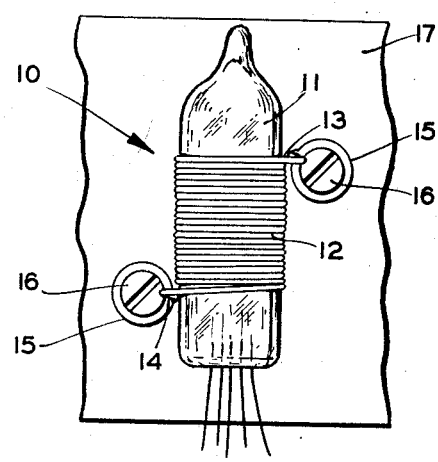
Figure 2:
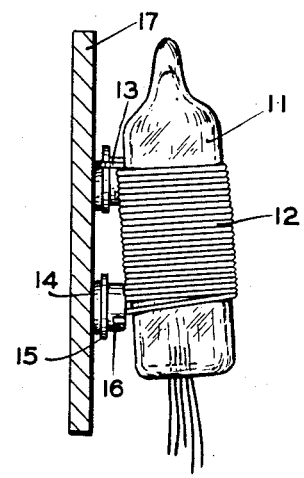
Figure 3:
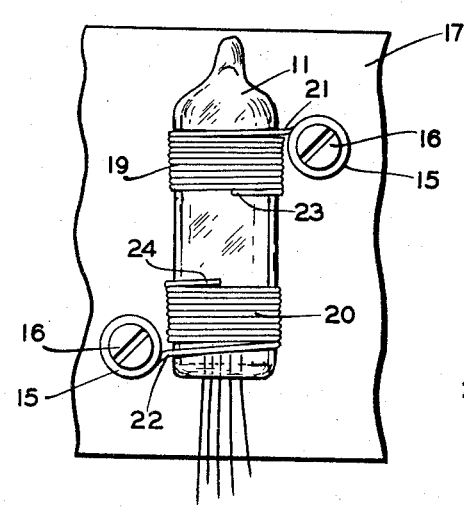
Figure 4:
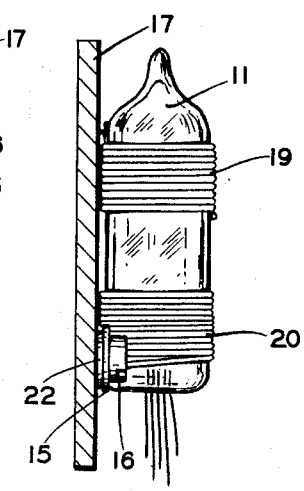

In the accompanying drawings forming a part of this specification wherein two of the various possible illustrative embodiments of this invention are shown, and wherein similar reference characters designate corresponding parts throughout the several views, Fig. 1 is a front elevational view of a shock mounting embodying my invention, Fig. 2 is a side elevational view of the shock mounting, Fig. 3 is a front elevational view of a second embodiment of the invention, while Fig. 4 is a side elevational view of the second embodiment of the shock mounting.

Referring now in detail to Figs. 1 and 2 of the drawings, the numeral 10 designates a shock mounting for a vacuum tube 11. The shock mounting comprises a coil spring 12 of slightly smaller free diameter than the tube 11. The spring 12 is illustrated enwrapping the envelope of the tube 11 about the median portion thereof and covering about half of the tube envelope, the coils or turns of the spring for the greater part abutting one the other without overlay. The ends 13 and 14 of the spring are of different lengths and are bent over and slipped under the washers 15 and around the screws 16 used in fastening the same to a mounting base or panel 17. It will be noted that by making the spring ends 13 and 14 of different lengths, the longitudinal axis of the tube is not parallel to the mounting base 17.

In mounting the tube 11 in the coil spring 12, one end of the spring may be fastened to the mounting panel 17 and the other end bent back to open the coils of the spring slightly. The tube 11 is then inserted within the coils of the spring and the second end is then fastened to the panel 17.

An attempt to slide the tube 11 out of the coils 12 will tend to decrease the already smaller diameter of the spring coils, tending to tighten the coils about the tube envelope thereby holding the tube fast. If the tube 11 is turned in attempting to remove the tube, the coils at one end of the spring, depending upon the direction of rotation, will unwind while the coils at the other end will tighten its hold on the tube. It is thus practically impossible to remove the tube from the coil spring when both ends thereof are fixed to the panel.

To remove the tube from its shock mounting, one end of the spring must be unfastened. The diameter of the coils of the spring may then be enlarged to permit the removal of the tube.

By making one end of the spring longer than the other, the natural frequency of both ends of the spring are different so that any shock or vibration is not readily transmitted to the coils of the spring and thence to the tube and its elements. The lengths of the spring ends are so chosen that the natural frequency of the mounted tube is outside any range of frequency to which the panel may be subjected.

The coil spring 12 also acts as a heat dissipating element for the tube 11. The spring being of metal forms a good conductor for the heat, the heat dissipation area being increased firstly, by the slight increase in diameter of the tube, and secondly by the area of the arcuate surfaces of the spring forming minute radiating fins.

Referring now to Figs. 3 and 4 of the drawings, the tube 11 is shown fixed to the panel 17 by two coil springs 19 and 20 wrapped about the tube near the ends thereof. The outer ends 21 and 22 of the respective springs are fastened to the panel by the washers 15 and screws 16. The inner ends 23 and 24 of the springs 19 and 20 are held against the envelope of the tube 11 by the bias thereof.

An examination of the springs 19 and 20 in Fig. 3 will disclose that the two springs are the same as though spring 12 in Fig. 1 were cut in half. Thus, the turning of the tube 11 or the attempted movement thereof to remove the tube from its mounting will in the first instance tighten one spring while loosening the other, or in the second instance, tighten both springs much in the same manner as described for spring 12. One end of one spring must be unfastened to permit the removal of the tube.

In Fig. 4 of the drawings, tube 11 is shown in engagement with the panel 17. In this instance the springs 19 and 20, and the panel 17 act as heat radiators for the tube in dissipating the heat thereof.

It will thus be seen that there is provided a shock mounting in which the several objects of this invention are achieved, and which is well adapted to meet the conditions of practical use.

As various possible embodiments might be made of the above invention, and as various changes might be made in the embodiments above set forth, it will be understood that all matter herein set forth, or shown in the accompanying drawings, is to be interpreted as illustrative and not in a limiting sense.

Having thus described my invention, I claim as new and desire to secure by Letters Patent:

1. A shock mounting for an object, comprising an object having a predetermined diameter, a support, a coil spring of slightly smaller free diameter than that of the object, extending around and in rotationally yieldable frictional engagement with the mounted object, the adjacent turns of said spring being in juxtaposition and the two end portions of said spring being fastened to said support, whereby rotation of the mounted object in either direction will tighten a portion of the spring against the object.

2. A shock mounting for an object, comprising an object having a predetermined diameter, a support, a coil spring of slightly smaller free diameter than that of the object, extending around and in rotationally yieldable frictional engagement with the mounted object, the adjacent turns of said spring being in juxtaposition and the two end portions of said spring being fastened to said support, the length of the spring end portions being unequal and differing in resonant frequency, whereby rotation of the mounted object in either direction will tighten a portion of the spring against the object.

3. A shock mounting for an object, comprising an object having a predetermined diameter, said mounting including a plurality of resilient turns extending around and frictionally engaging said object, the turns being of smaller free diameter than the object, opposite end portions of said mounting being fastened to said support, said turns extending around the object in the same direction with respect to one of said fastened end portions, whereby the turning of the mounted object within said turns in one direction tightens some of said turns about the object and unwinds others of said turns.

4. A shock mounting for an object, comprising an object having a predetermined diameter, a support, a coil spring in two axially aligned sections wound in the same direction with respect to one end of the spring, each section having a slightly smaller diameter than the object, extending around and frictionally engaging said object, and means fastening the outer end portion of each spring section to said support, whereby turning of the mounted object in either direction tightens one section and loosens the other.

5. A shock mounting for an object, comprising an object of predetermined diameter, a support, and a plurality of spiral resilient object encircling rotationally yieldable turns having a lesser free diameter than the object, extending around and frictionally engaging the object, and having end portions fixedly secured to said support at spaced points adjacent to opposite ends of the mounting, the resilient turns extending around the object in the same direction with respect to one of said points, whereby rotation of the mounted object in either direction will tighten a resilient turn about the object.

References Cited in the file of this patent

UNITED STATES PATENTS

| | | |
|---|---|---|
| 821,833 | Shaffner | May 29, 1906 |
| 905,944 | Southard | Dec. 8, 1908 |
| 1,319,334 | Hartung | Oct. 21, 1919 |
| 1,599,251 | Short | Sept. 7, 1926 |
| 1,616,139 | Ronci | Feb. 1, 1927 |
| 1,636,431 | Parks | July 19, 1927 |
| 1,820,839 | Smalley | Aug. 25, 1931 |
| 2,451,067 | Butler | Oct. 12, 1948 |
| 2,459,514 | Flickinger | Jan. 18, 1949 |

FOREIGN PATENTS

| | | |
|---|---|---|
| 360,350 | Great Britain | Nov. 5, 1931 |